(12) United States Patent
Yoon

(10) Patent No.: US 9,964,957 B2
(45) Date of Patent: May 8, 2018

(54) METHOD FOR CONTROLLING VEHICLE ACCORDING TO DESTINATION TYPE

(71) Applicant: Hyundai Motor Company, Seoul (KR)

(72) Inventor: Ji Hyun Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 15/208,319

(22) Filed: Jul. 12, 2016

(65) Prior Publication Data

US 2017/0123432 A1 May 4, 2017

(30) Foreign Application Priority Data

Oct. 28, 2015 (KR) .................. 10-2015-0150423

(51) Int. Cl.
| | | |
|---|---|---|
| *G05D 1/02* | (2006.01) | |
| *G05D 1/00* | (2006.01) | |
| *G01C 22/00* | (2006.01) | |
| *B60W 30/06* | (2006.01) | |
| *B60W 50/14* | (2012.01) | |

(52) U.S. Cl.
CPC ........... *G05D 1/0248* (2013.01); *B60W 30/06* (2013.01); *B60W 50/14* (2013.01); *G05D 1/0088* (2013.01); *G05D 1/0214* (2013.01); *B60W 2400/00* (2013.01); *B60W 2720/10* (2013.01); *G05D 2201/0213* (2013.01)

(58) Field of Classification Search
CPC ....... G05D 2201/0203; G05D 23/1917; G05D 1/0027; G05D 23/1934; G05D 1/0212; G05D 2201/0213; G05D 1/021; G05D 2201/0216; G05D 1/02; G01C 21/3484; G01C 21/3446; G01C 21/10; G01C 21/3614; G01C 21/3407
USPC ....... 701/23, 533, 22, 1, 117, 19, 2, 25, 400, 701/102, 112, 118
See application file for complete search history.

(56) References Cited

U.S. PATENT DOCUMENTS

| | | | |
|---|---|---|---|
| 7,421,336 B2 | 9/2008 | Iwami et al. | |
| 7,584,050 B2 | 9/2009 | Naito et al. | |
| 8,688,306 B1 * | 4/2014 | Nemec ................. | G05D 1/0055 104/250 |
| 9,304,009 B2 * | 4/2016 | Beaurepaire ....... | G01C 21/3617 |
| 9,429,943 B2 * | 8/2016 | Wilson ................. | G05D 1/0246 |
| 9,523,984 B1 * | 12/2016 | Herbach ............... | B62D 15/025 |
| 9,639,994 B2 * | 5/2017 | Beaurepaire ........... | G05D 1/021 |

(Continued)

FOREIGN PATENT DOCUMENTS

| | | |
|---|---|---|
| JP | 2010-003170 A | 1/2010 |
| JP | 2011-118603 A | 6/2011 |

(Continued)

*Primary Examiner* — Jelani A Smith
*Assistant Examiner* — Luis A Martinez Borrero
(74) *Attorney, Agent, or Firm* — Brinks Gilson & Lione

(57) ABSTRACT

A method for controlling a vehicle according to a destination type may promote convenience of a driver by changing a method for controlling a self driving vehicle according to a destination type set by the driver. The method for controlling a vehicle according to a destination type includes: deciding whether or not a destination type selected from a driver is a final destination; and controlling the vehicle to stop in the rightmost lane of a road closest to the final destination after the vehicle arrives at the vicinity of the final destination, when the selected destination type is the final destination.

7 Claims, 3 Drawing Sheets

(56) References Cited

U.S. PATENT DOCUMENTS

| | | | |
|---|---|---|---|
| 9,665,101 B1* | 5/2017 | Templeton | G05D 1/0272 |
| 2013/0231824 A1* | 9/2013 | Wilson | G05D 1/0246 |
| | | | 701/26 |
| 2014/0172220 A1 | 6/2014 | You | |
| 2014/0222278 A1 | 8/2014 | Fujita | |
| 2015/0337587 A1* | 11/2015 | Lu | E05F 15/70 |
| | | | 701/49 |
| 2016/0189435 A1* | 6/2016 | Beaurepaire | G05D 1/021 |
| | | | 705/13 |
| 2017/0016738 A1* | 1/2017 | Sakuma | G01C 21/3605 |
| 2017/0118307 A1* | 4/2017 | Beaurepaire | H04L 67/327 |
| 2017/0147004 A1* | 5/2017 | Reichel | B60W 40/08 |
| 2017/0197634 A1* | 7/2017 | Sato | B60W 50/082 |
| 2017/0197635 A1* | 7/2017 | Sato | B60W 50/082 |
| 2017/0197637 A1* | 7/2017 | Yamada | B60W 50/10 |
| 2017/0199523 A1* | 7/2017 | Barton-Sweeney | B60W 30/00 |
| 2017/0212511 A1* | 7/2017 | Paiva Ferreira | G06Q 10/08 |
| 2017/0220045 A1* | 8/2017 | Templeton | G05D 1/0225 |
| 2017/0225702 A1* | 8/2017 | Yamada | B62D 1/22 |
| 2018/0037262 A1* | 2/2018 | Imai | B62D 15/0285 |

FOREIGN PATENT DOCUMENTS

| | | |
|---|---|---|
| JP | 5536976 B2 | 7/2014 |
| JP | 2013027803 | 3/2015 |
| JP | 5773202 B2 | 9/2015 |
| KR | 10-2013-0091907 | 8/2013 |
| KR | 10-1371866 | 3/2014 |
| KR | 10-2014-0106939 | 9/2014 |
| KR | 10-2015-0009725 | 1/2015 |
| KR | 10-2015-0053477 | 5/2015 |

* cited by examiner

METHOD FOR CONTROLLING VEHICLE ACCORDING TO DESTINATION TYPE

CROSS-REFERENCE TO RELATED APPLICATION

The present application is based on and claims the benefit of priority to Korean Patent Application No. 10-2015-0150423, filed on Oct. 28, 2015 in the Korean Intellectual Property Office, the disclosure of which is incorporated herein in its entirety by reference.

TECHNICAL FIELD

The present disclosure relates to a method for controlling a vehicle, and more particularly, to a method for controlling a self driving vehicle according to a destination type

BACKGROUND

Recently, in accordance with rapid development of vehicle related technology, a vehicle system in which convenience of a driver is significantly improved has been commercialized in various patterns. As a typical function of these convenience functions of a vehicle, there is a smart cruise control (SCC). The SCC is a convenience apparatus providing freedom in a longitudinal direction to a driver by automatically driving and braking the vehicle so that a speed of the vehicle is maintained as a speed set by the driver.

In addition, as a convenience function of sensing a driving path, there is a lane departure warning system. The lane departure warning system, which is a kind of vision system using a camera sensor, may be configured to recognize a lane of a road using a camera to provide a warning to the driver in the case in which the vehicle departs from the lane due to drowsiness or carelessness of the driver.

These two systems, which are systems that are currently commercialized, have been mounted as a driver convenience or safety system in a high-class vehicle.

In addition, recently, a technology of providing a function of allowing the driver to set a predetermined speed or constantly maintaining a road speed limit to the driver has appeared.

Further, a technology of allowing the driver to set a desired time at which the vehicle will arrive at a destination in order to arrive at the destination within a defined time or allowing the vehicle to automatically adjust a speed of the vehicle by reflecting a traffic volume, or the like, has been required.

SUMMARY

The present disclosure has been made to address the above-mentioned problems occurring in the prior art while advantages achieved by the prior art are maintained intact.

An aspect of the present disclosure provides a method for controlling a vehicle according to a destination type capable of promoting convenience of a driver by changing a method for controlling a self driving vehicle according to a destination type set by the driver.

Other objects and advantages of the present disclosure may be understood by the following description and will be more clearly appreciated by exemplary forms of the present disclosure. It may be easily appreciated that objects and advantages of the present disclosure may be realized by means mentioned in the claims and a combination thereof.

According to an exemplary form of the present disclosure, a method for controlling a vehicle according to a destination type includes: deciding whether or not a destination type selected from a driver is a final destination; and controlling the vehicle to stop in the rightmost lane of a road closest to the final destination after the vehicle arrives at the vicinity of the final destination, when the selected destination type is the final destination.

The destination type may include the final destination, a landmark around the final destination, or a passage place that is not recognized whether or not it is the final destination, and the landmark may include a surrounding building, facility, or signboard.

The final destination may be the same as a point at which the driver gets out of the vehicle.

The method for controlling a vehicle according to a destination type may further include, when the driver gets out of the vehicle after the vehicle stops in the rightmost lane of the road closest to the final destination: switching the vehicle into an autonomous parking mode; and allowing the vehicle to search a parking lot around the vehicle and perform autonomous parking in the searched parking lot.

In the controlling of the vehicle to stop in the rightmost lane, a sensor provided in the vehicle may be used, and lane information of a camera, a method for recognizing a curb using a laser scanner, or lane information of a navigation map may be used.

The method for controlling a vehicle according to a destination type may further include, when the selected destination type is not the final destination: warning the driver that the destination is not the final destination; and allowing the driver to directly drive the vehicle up to the final destination, after the vehicle arrives at the vicinity of the destination.

The method for controlling a vehicle according to a destination type may further include, when the driver does not select the destination type: comparing a distance up to the destination or a time required for the vehicle to arrive at the destination with a preset distance or a preset time, respectively; and inducing the driver again select a destination type in the case in which the distance up to the destination or the time required for the vehicle to arrive at the destination is the preset distance or time or less.

The method for controlling a vehicle according to a destination type may further include, when the driver does not continuously select the destination type: warning the driver that the destination is not the final destination; and allowing the driver to directly drive the vehicle up to the final destination.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Advantages and features of the present disclosure and methods accomplishing them will become apparent from exemplary forms described below in detail with reference to the accompanying drawings. However, the present disclosure is not limited to exemplary forms described herein, but may be implemented in other forms. These exemplary forms are provided in order to describe the present disclosure in detail so that those skilled in the art to which the present disclosure pertains may easily practice the spirit of the present disclosure.

In the accompanying drawings, exemplary forms of the present disclosure are not limited to illustrated specific forms, but are exaggerated for the purpose of clarity. Although specific terms have been used in the present specification, they are used in order to describe the present disclose and are not used in order to limit the meaning or the scope of the present disclosure, which is disclosed in the appended claims.

In the present specification, a term 'and/or' is used as the meaning including at least one of components arranged before and after the term. In addition, terms 'connected/coupled' are used as the meaning including that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations, and elements.

Hereinafter, an exemplary form of the present disclosure will be described in detail with reference to the accompanying drawings.

An electronic controller unit of a vehicle may recognize lane information, or the like, using a sensor including a radar of the corresponding vehicle, a scanner V2X communication scheme, and the like, and recognize and compare whether or not a destination set by a driver and a final destination are the same as each other or a landmark, or the like, of the final destination.

Figure 1:
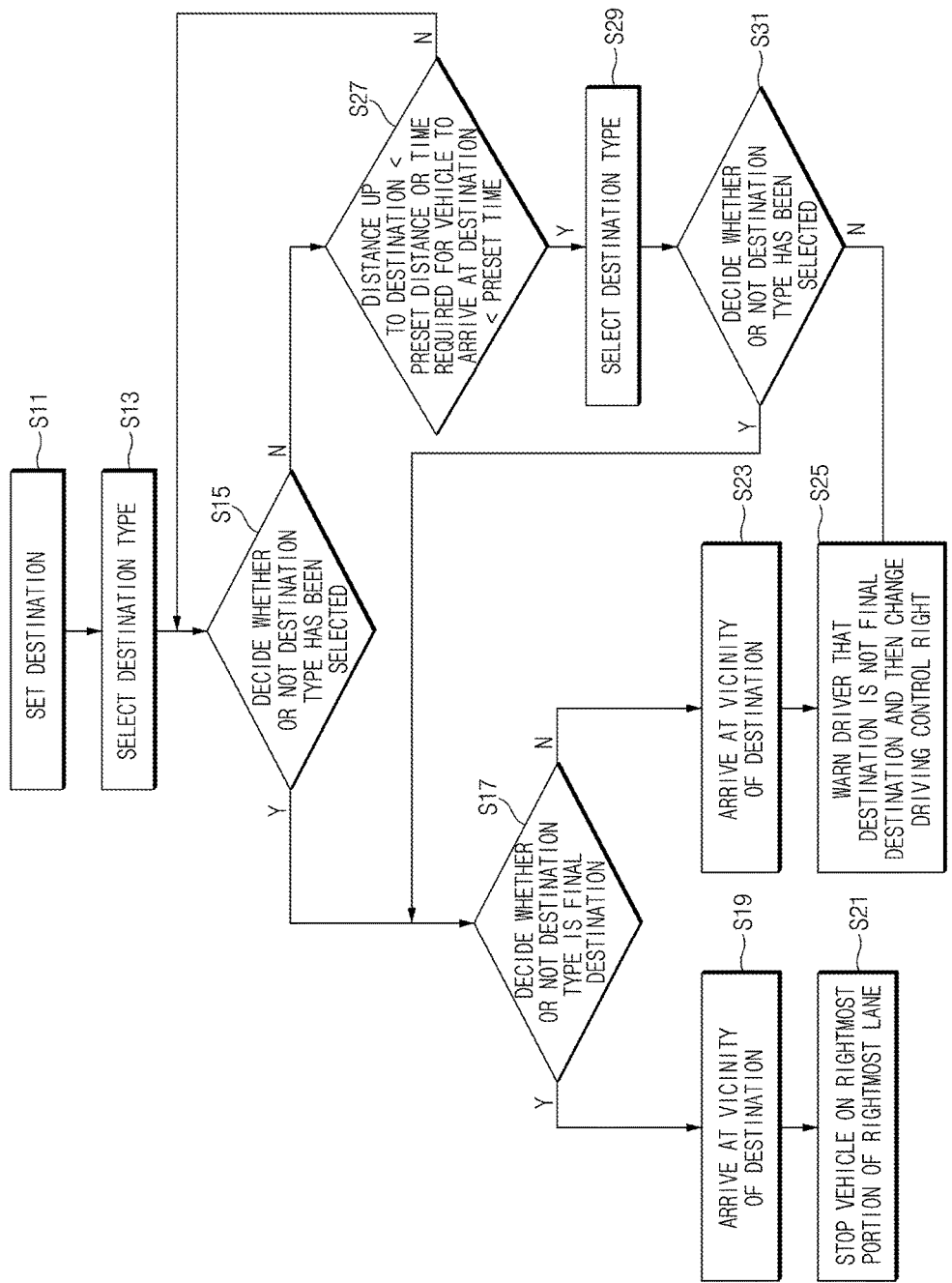
FIG. 1 is a flow chart for describing a method for controlling a vehicle according to a destination type.

FIG. 1 is a flow chart for describing a method for controlling a vehicle according to a destination type.

Referring to FIG. 1, a driver sets a destination using an audio video navigation (AVN) apparatus (S11).

Next, the driver may select whether the destination is a final destination or a landmark (a surrounding building, facility, signboard, or the like) around the final destination (S13) after he/she sets the destination.

That is, the driver may select a destination type, which may include the final destination, the landmark around the final destination, a destination or a passage place that may not be recognized whether or not it is the final destination.

In addition, a controller of the vehicle may decide that the final destination is a point at which the driver gets off the vehicle.

In detail, when the driver does not select the destination type (the final destination, the landmark around the final destination, or the like) after he/she sets the destination, the controller of the vehicle decides that the driver selects a general destination or the passage place rather than the final destination, thereby driving the vehicle up to only the input destination.

Next, the controller of the vehicle decides whether or not the driver has accurately set the destination type (S15).

Then, it is decided whether or not the destination type selected by the driver is the final destination (S17), in the case in which the driver selects the destination type. That is, it may be decided whether or not the destination type selected by the driver is the same as the final destination.

Next, the controller of the vehicle controls the vehicle to stop in the rightmost lane of a road closest to the final destination after the vehicle arrives at the vicinity of the final destination (S19 and S21), when the destination type selected by the driver is the final destination.

Here, when the driver gets out of the vehicle after the vehicle stops in the rightmost lane of the road, the controller of the vehicle switches the vehicle into an autonomous parking mode, searches a parking lot around the vehicle, and performs autonomous parking in the searched parking lot.

In addition, a method for controlling the vehicle to stop in the rightmost lane of the road is decided using a sensor provided in the vehicle.

For example, the controller of the vehicle may decide the rightmost lane and perform a control using right lane information of a camera, a method for recognizing a curb using a laser scanner, or lane information of a navigation map.

However, the controller of the vehicle warns the driver that the destination is not the final destination and allows the driver to take charge of a control for the next destination of the vehicle after the vehicle arrives at the vicinity of the destination (S23 and S25), when the destination type selected by the driver is not the final destination.

That is, a driving control right associated with driving may be changed from the controller of the vehicle into the driver, and the driver may directly drive the vehicle up to the final destination.

However, in the case in which the driver does not select the destination type in S15, a distance up to the destination and a time required for the vehicle to arrive at the destination are compared with a preset distance and a preset time, respectively (S27).

Next, in the case in which the distance up to the destination or the time required for the vehicle to arrive at the destination is the preset distance or time or less (before the vehicle arrives at the destination), the controller of the vehicle induces the driver to again select a destination type, and the driver again selects the destination type (S29).

Next, the controller of the vehicle decides whether or not the driver has accurately set the destination type, and then decides whether or not the destination type selected by the driver is a final destination (S31).

However, when the driver does not continuously select the destination type, the controller of the vehicle warns the driver that the destination is not the final destination, and may allow the driver to directly drive the vehicle up to the final destination.

Figure 2:
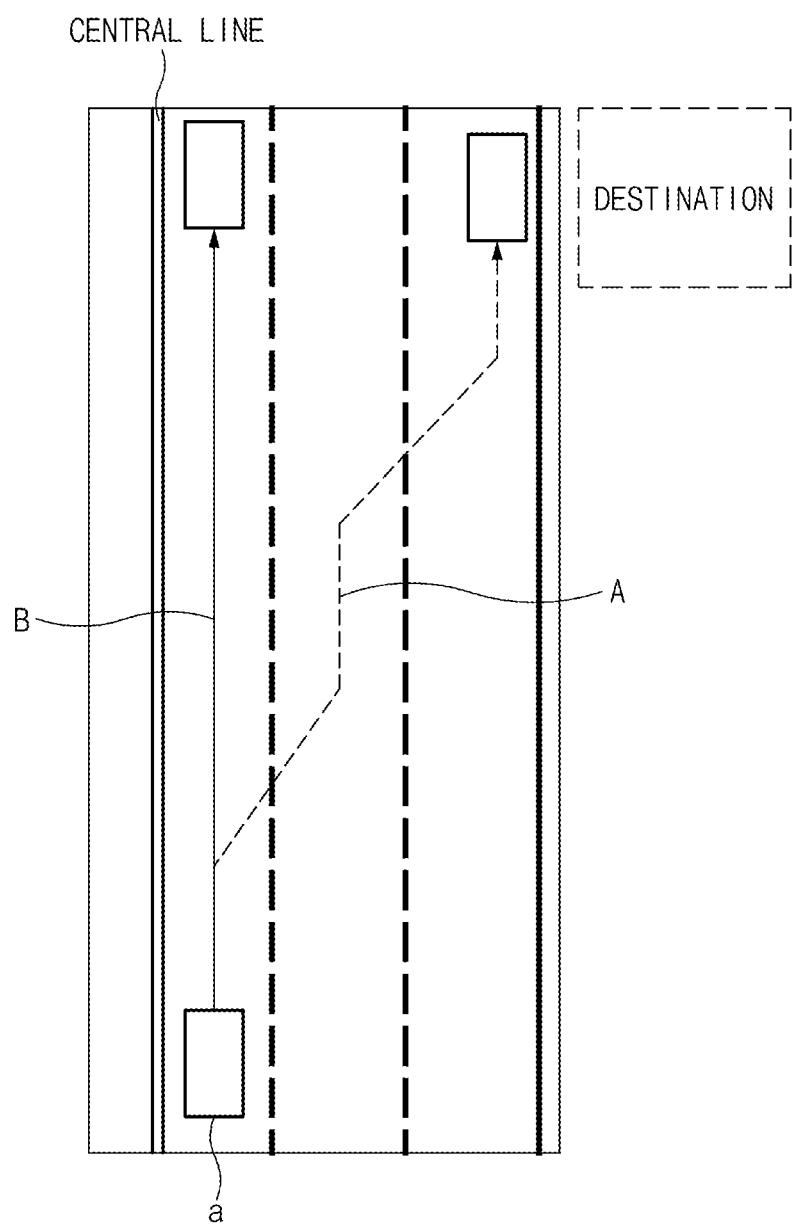
FIG. 2 is a view for describing a path of a vehicle according to a destination type set by a driver.

FIG. 2 is a view for describing a path of a vehicle according to a destination type set by a driver.

Referring to FIG. 2, the driver may select whether the destination is a final destination or a landmark around the final destination (a building, a facility, a signboard, or the like, around the final destination) after he/she sets the destination.

For example, a driving path A of a vehicle a in the case in which the destination set through the AVN apparatus by the driver is the final destination (a point at which the driver gets off the vehicle) is illustrated, and a driving path B of the vehicle a in the case in which the destination set through the AVN apparatus by the driver is the landmark around the final destination is illustrated.

Here, in the case in which the destination set through the AVN apparatus by the driver is the final destination and the final destination is a building, the controller of the vehicle controls the vehicle to stop on the rightmost lane of a road most adjacent to the building, and may allow the vehicle to stop at the rightmost portion (the rightmost point) of the rightmost lane, such that safety and convenience of the driver may be increased when the driver gets off the vehicle.

Figure 3:
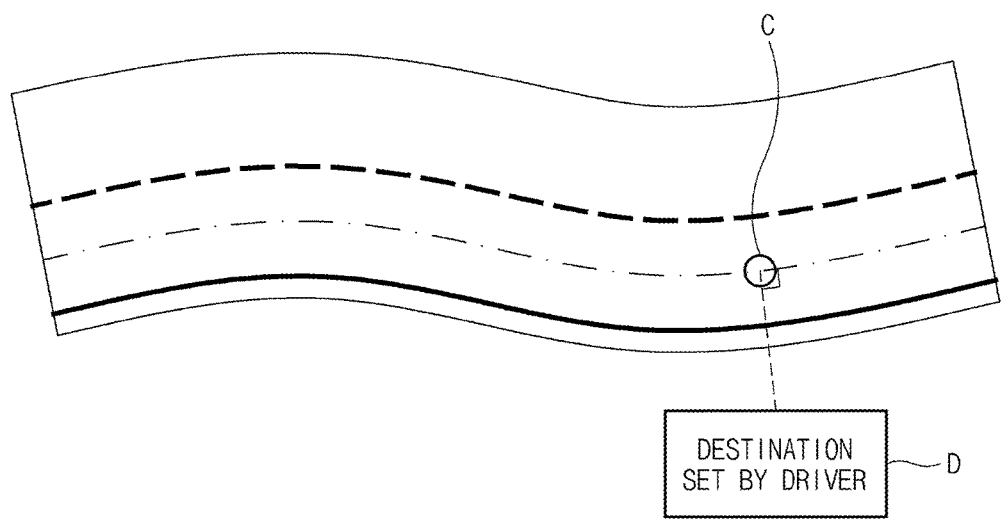
FIG. 3 is a view for describing a destination set by a driver.

FIG. 3 is a view for describing a destination set by a driver.

Referring to FIG. in the case in which the destination set by the driver is the final destination, the controller of the vehicle arbitrarily selects a central portion C in the rightmost lane of a destination at which the vehicle will stops, and a point (a region) having the shortest distance from the destination D set by the driver to the central portion C in the rightmost lane becomes a final destination calculated by the controller of the vehicle.

As described above, the present technology is a technology of promoting convenience of the driver by changing a method for controlling a self driving vehicle according to the destination type set by the driver.

The present technology is a technology of providing the convenience of the driver by determining behavior of the self driving vehicle and freely adjusting a control of the driver for the vehicle after the vehicle arrives at the destination set by the driver.

Hereinabove, although the present disclosure has been described with reference to exemplary forms and the accompanying drawings the present disclosure is not limited thereto, but may be variously modified and altered by those skilled in the art to which the present disclosure pertains without departing from the spirit and scope of the present disclosure claimed in the following claims.

What is claimed is:

1. A method for controlling a vehicle according to a destination type, the method comprising:
   when receiving, by a controller of the vehicle, a first input command including a selected destination and a selected destination type:
      determining, by the controller of the vehicle, whether the selected destination type is a final destination; and
      controlling, by the controller of the vehicle, the vehicle to stop in a rightmost lane of a road closest to the selected destination after the vehicle arrives at a vicinity of the selected destination, when the selected destination type is the final destination;
   when receiving, by the controller of the vehicle, a second input command including the selected destination and not the selected destination type:
      comparing, by the controller of the vehicle, a distance to the selected destination or a predicted time for the vehicle to arrive at the selected destination with a preset distance or a preset time, respectively; and
      presenting, by the controller of the vehicle, a user input for a destination type when the distance to the selected destination or the predicted time for the vehicle to arrive at the destination is less than or equal to the preset distance or the preset time, respectively.

2. The method according to claim 1, wherein the destination type includes the final destination, a landmark around the final destination, or a passage place that is not recognized whether or not it is the final destination, and the landmark includes a surrounding building, facility, or signboard.

3. The method according to claim 1, wherein the final destination is the same as a point at which a driver gets off the vehicle.

4. The method according to claim 1, further comprising, when a driver is detected to get out of the vehicle after the vehicle stops in the rightmost lane of the road closest to the final destination:
   switching the vehicle into an autonomous parking mode; and
   allowing the vehicle to search a parking lot around the vehicle and to perform autonomous parking in the searched parking lot.

5. The method according to claim 1, wherein controlling the vehicle to stop in the rightmost lane comprises utilizing a sensor provided in the vehicle, referencing lane information obtained from a camera, recognizing a curb using a laser scanner, or referencing lane information obtained from a navigation map.

6. The method according to claim 1, further comprising, when the selected destination type is not the final destination:
   warning the driver that the destination is not the final destination; and
   allowing a driver to directly drive the vehicle up to the final destination, after the vehicle arrives at the vicinity of the destination.

7. The method according to claim 1, further comprising, when a driver does not continuously select the destination type:
   warning the driver that the destination is not the final destination; and
   allowing the driver to directly drive the vehicle up to the final destination.

* * * * *